United States Patent Office 3,435,551
Patented Apr. 1, 1969

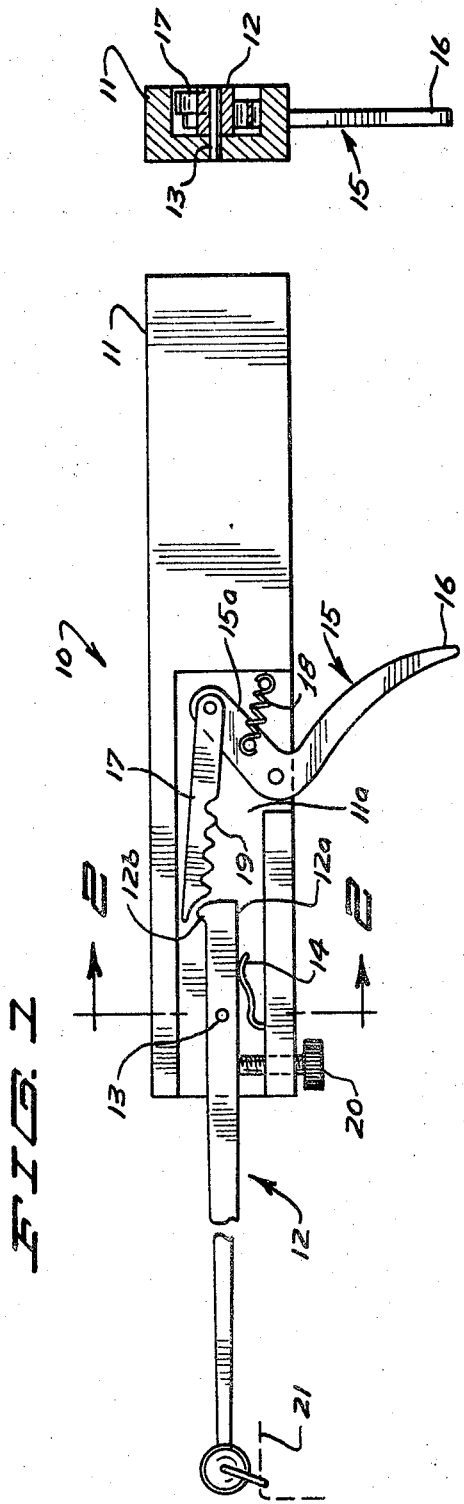

3,435,551
FISHING ROD
Toivo Koistinen, Box 25, Varkaus, Finland
Filed Sept. 16, 1966, Ser. No. 579,899
Int. Cl. A01k 87/00
U.S. Cl. 43—19.2            5 Claims

ABSTRACT OF THE DISCLOSURE

A fishing rod structure providing a handle member with a rod portion extending outwardly from the handle member with trigger means associated with the rod portion of the unit arranged to intermittently strike or move the rod portion such that a vibration is set up in the rod portion. This trigger control may be provided in close association to one end of the rod when the rod is pivotally mounted within the handle and a ratchet type unit is provided to be moved by this trigger and be drawn across the inner end of the rod to provide a plurality of intermittent vibratory effects on the rod end which will be transmited along the rod.

---

In the past in deep water or winter fishing, rods have been developed for jigging in which the lure is controlled by hand to impart a desired motion to the lure. Some rods are equipped with a bending or elastic end-part to facilitate this motion but these have to date proved to be too insensitive for proper bait movement.

An object of this invention is to give a bait through a systematic and controlled movement of the line that alters the position of the bait in different, wanted positions, quivering movements to act as an added attraction to fish.

These and other objects and advantages of my invention will more fully appear from the following description made in conection with the accompanying drawings, wherein like reference characters refer to the same or similar parts throughout the several views, and in which:

FIG. 1 is a view taken through the operative portions of a rod embodying the concepts of applicant's invention;

FIG. 2 is a section taken substantially along line 2—2 of FIG. 1.

In accordance with the accompanying drawing a fishing rod 10 includes a handle portion 11 and a rod portion 12 having one end 12a thereof pivotally mounted in spaced relation to the end through pin 13 within a rod-receiving cavity 11a of handle 11. The pivotally mounted end 12a includes an enlarged actuator element 12b thereon and a spring member 14 is provided within cavity 11a in close relation thereto.

A trigger actuator 15 is pivotally mounted within cavity 11a with an actuating end 16 extending therefrom. A lever member 17 is attached to the internal end 15a of trigger 15 for movement therewith and a return spring 18 is provided to insure return of trigger 15 and lever 17 to the position of FIG. 1.

A plurality of actuator element engaging detents 19 are formed on the end of lever 17 in position to engage the actuator element 12b of rod 12 and force the same downwardly and permit spring-loaded return upwardly when lever 17 is urged forwardly through actuation of trigger 15. This motion as well as the position of the rod 12 with respect to handle 11 may be controlled through an adjustable thumbscrew 20 or the like.

When fishing, a line 21 is either attached to the extending end of rod 12 or may be connected thereto through a reel arrangement. Quivering motion is developed through line 21 to the lure by pulling trigger 15 and releasing the same with a long release or a series of short releases. The frequency of vibrations is controlled through the trigger action.

What I claim is:
1. A fishing rod including:
 (a) a handle;
 (b) a rod portion pivotally carried by said handle and providing an end extending in one direction from the pivot on said handle and adapted for carrying a line and lure through the extending end thereof, and providing an actuating end extending in the opposite direction from said pivot; and
 (c) lever means for applying mechanical vibrations to said rod by engaging the actuating end thereof.
2. The structure set forth in claim 1 wherein said lever means includes:
 (a) a lever having a plurality of detents therein for engaging said actuating end of said rod; and
 (b) means for moving said lever into contacting relation to said actuating end and retracting the same therefrom whereby engagement with said detents provides a vibratory motion to said rod.
3. The structure set forth in claim 2 and spring means normally holding the actuating end of said rod in lever contacting position.
4. The structure set forth in claim 2 and spring means arranged to retract said lever from contacting relation with said actuating rod end.
5. The structure set forth in claim 1 and means for positioning said rod within said handle about said pivot.

References Cited

UNITED STATES PATENTS

| 2,882,638 | 4/1959 | Moore | 43—26.1 |
| 2,758,407 | 8/1956 | Speidell | 43—19.2 |
| 2,821,042 | 1/1958 | Kneisel | 43—19.2 |
| 3,074,197 | 1/1963 | Schnars | 43—19.2 |

SAMUEL KOREN, Primary Examiner.

D. L. LEACH, Assistant Examiner.